United States Patent Office 3,412,287
Patented Nov. 19, 1968

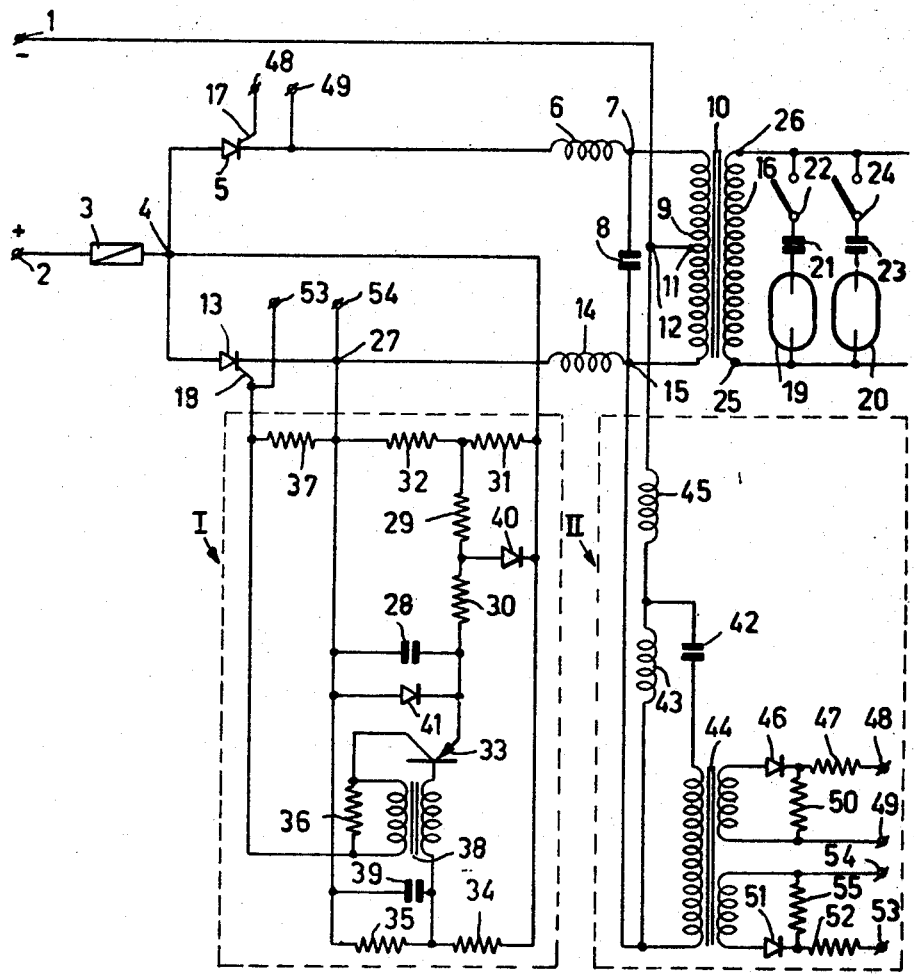

3,412,287
ELECTRICAL ARRANGEMENT
Theodorus Hehenkamp, Emmasingel, Eindhoven, Netherlands, assignor to North American Philips Company, Inc., New York, N.Y., a corporation of Delaware
Continuation of application Ser. No. 488,617, Sept. 20, 1965. This application Nov. 30, 1967, Ser. No. 687,071
Claims priority, application Netherlands, Sept. 23, 1964, 6411058
6 Claims. (Cl. 315—258)

ABSTRACT OF THE DISCLOSURE

A DC-AC converter comprises the series-combination of a semiconductor controlled rectifier, an inductor, and a circuit arrangement having an equivalent circuit comprising the parallel combination of a capacitor and a second inductor. A load circuit comprising two or more parallel branches that can be selectively switched in or out of the circuit is coupled to the converter. Each parallel branch of the load comprises an electric discharge lamp in series with a capacitor. The load circuit forms part of an undercritically damped resonant circuit for the converter. The inductance ratio of the second inductor to the first inductor is chosen to be less than 15 to 1, and preferably less than 10 to 1.

---

This application is a continuation of Ser. No. 488,617, filed Sept. 20, 1965, now abandoned.

This invention relates to electrical arrangements comprising a direct current-alternating current converter and a load, wherein the converter comprises a series-combination of a controlled semiconductor rectifier, an inductance and a circuit, the substitution diagram of this circuit consisting of a parallel combination of a capacitance and a second inductance, and wherein the said series-combination is intended to be connected to a supply source and the said circuit is coupled to the load which comprises two or more gas and/or vapour-discharge lamps and constitutes, together with the series-combination of the converter, an oscillatory circuit which is damped undercritically.

In the foregoing reference is made to the substitution diagram of a circuit. The actual circuit comprises, for example, the combination of a primary winding of a transformer and a capacitor shunting the said winding. The prints of connection of the actual circuit to the above-mentioned series-combination of the converter are formed, for example, by the two ends of the primary winding of the transformer. The points of connection may also be formed by one end of the primary winding of the transformer and a centre tap on this primary winding. The latter case usually occurs with converters comprising two controlled semiconductor rectifiers in push-pull connection.

An oscillatory circuit damped undercritically is understood to mean an oscillatory circuit in which the current flowing through the connecting wires upon connection to a direct-current source initially increases, then decreases to zero and subsequently tends to reverse its direction. It is known per se that extinction of the controlled semiconductor rectifier or rectifiers associated with the converter, sometimes referred to as thyristor(s), by means of an oscillator circuit damped undercritically is very simple.

Known electrical arrangements of the kind referred to in the preamble have a disadvantage. In fact, such arrangements are usually suitable for only one predetermined load. It is to be noted that a converter can be made suitable for more than one load by increasing or decreasing the capacitance of the oscillatory circuit. By adding capacitors to various parts of the load it may even be achieved that the capacitance of the oscillatory circuit invariably retains a favourable value when the load is increased or decreased. However, due to the negative current-voltage characteristic and the often great temperature dependence of this characteristic, a stabilized gas- and/or vapour-discharge lamp cannot be regarded as a constant load so that additional capacitors, even when proportioned optimally, cannot always provide correct matching of the capacitance. This gives rise, for example, to undesirable variations in voltage and/or frequency of the converter.

An object of the invention is to obviate, or at least decrease, the disadvantage of known electrical arrangements of the said kind, namely their poor operation with a variable load.

An electrical arrangement according to the invention comprises a direct-current-alternating current converter and a load, wherein the converter comprises a series-combination of a controlled semiconductor rectifier, an inductance and a circuit, the substitution diagram of this circuit consisting of a parallel combination of a capacitance and a second inductance, and wherein the said series-combination is intended to be connected to a supply source and the said circuit is coupled to the load. The load comprises two or more gas and/or vapour-discharge lamps and constitutes, together with the series-combination of the converter, an oscillatory circuit which is damped undercritically. The invention is characterized in that the ratio between the second inductance and the first-mentioned inductance is smaller than 15 and preferably smaller than 10, and that parts of the load, each of which comprises at least one discharge lamp and which have a capacitive character at the operating frequency of the converter, can be switched off individually.

Switching off a part of the load is understood to mean that part of the load circuit is made idle by means of a switch or, in certain cases, that a discharge lamp is, for example, loosened or switched out of the circuit in any other way.

An arrangement according to the invention affords the advantage that the reactive power of the circuit included in the series-combination of the converter may be chosen so that deviations in the reactive power of one part of the load, and/or deviations in the characteristics of the operative gas- and/or vapour-discharge lamps, relative to the nominal values, have little effect on the operation of the converter. This may give rise, together with the capacitve character of the load, to a variation in the load having only a small influence on the output voltage and the frequency of the converter.

The reactive power of the circuit included in the series-combination of the converter may be given a high value by giving the inductance of the said circuit (that is the so-called second inductance) a value which is much lower than has been common practice hitherto for direct current-alternating current converters. This second inductance has previously been given a high value since it was known that the thyristor current during the start could not have a zero passage if the impedance of the circuit included in the series-combination of the converter is low. This was connected with the fact that the load further reduced the apparent impedance of the circuit included in the series-combination of the converter. The recognition that, upon the start, the impedance of a load comprising gas- and/or vapour-discharge lamps is very high due to the retardation in the ignition of the said lamps has led to the idea that an exceptionally low value for the impedance of the circuit could be realized. Consequently, it was also possible to obtain an exceptionally low ratio between the inductance of the circuit (the so-called second inductance) and the first inductance (of the series-combination).

An arrangement according to the invention may supply current to, for example, two or more individually switchable groups of lamps. The lamps of one group may be connected, for example, in series. In a given embodiment the load consists of the parallel combination of two or more individually switchable partial circuits each of which comprises a gas- and/or vapour-discharge lamp.

A gas- and/or vapour-discharge lamp may be stabilized, for example, by inductive means. In this case the lamp, together with the inductive stabilized apparatus, is shunted by a capacitor which must have a value such that the total load is capacitive. The said capacitor is preferably so proportioned that its power is approximately equal to the reactive power of the inductive stabilizing apparatus increased by 1.5 times the power of the lamp. With such proportioning the influence of a variation in load on the output voltage and frequency of the converter may then become very small.

In one special embodiment of the electrical arrangement, the partial load which may be switched off individually comprises a series-combination of a gas- and/or vapour-discharge lamp and a capacitor. This special embodiment affords the advantage that the capacitive character of the load is obtained by means of an element which also serves for stabilisation of the lamp, whilst also a group of several lamps can be switched in without a risk of excess voltages. In fact, as long as a lamp is not ignited no current flows through the capacitor associated with it so that this part of the load has no premature capacitive power. Another advantage of this embodiment is that a defective lamp also makes idle the capacitor associated with it.

In another special embodiment of the electrical arrangement, in a part of the load adapted to be switched off individually and comprising a series-combination of a gas- and/or vapour-discharge lamp and a capacitor, the ratio between the apparent power of the capacitor and the power of the lamp is more than 1.1 and less than 1.7, and preferably more than 1.3 and less than 1.5, at the operating frequency of the converter.

This special embodiment affords the advantage that the possibility of switching on parts of the load individually or in groups is attended with a high degree of independence between the output voltage and the frequency of the converter on the one hand and the magnitude of the load on the other. If the specified power ratio is less than 1.1 the following disadvantage occurs. The output voltage of the converter decreases when adding partial loads because the reactive power of the circuit damped undercritically increases insufficiently relative to the damping thereof. If the specified power ratio is more than 1.7 the following disadvantage occurs. The output voltage of the converter increases when adding partial loads because the reactive power of the circuit damped undercritically then increases too rapidly relative to the damping.

It is to be noted that variations in the output voltage of the converter may be counteracted if necessary by varying the operating frequency of the converter. However, outside the specified ratio range from 1.1 to 1.7 such a frequency variation must be such that its influence on the luminance of lamps already switched on is no longer negligible.

In order that the invention may be readily carried into effect, one embodiment thereof will now be described in detail, by way of example, with reference to the accompanying diagramatic drawing showing an electrical arrangement comprising a converter and a load constituted by metal-vapour discharge lamps.

In the figure connecting terminals 1 and 2 of the arrangement are intended to be connected to the negative and positive terminals, respectively, of a direct current source. The current flows from terminal 2 through a series-combination including a fuse 3, a tap 4, a thyristor 5, an inductor 6, a tap 7, a circuit comprising a capacitor 8 on the one hand and a primary winding 9 of a transformer 10 on the other hand, a centre tap 11, a tap 12 and the connecting terminal 1. The illustrated converter is equipped with two thyristors connected in push-pull. The converter comprises, in addition to the above-mentioned series-combination, a second branch which extends from a tap 4 through a thyristor 13 to an inductor 14 and then to a tap 15 located between the capacitor 8 and the primary winding 9 of transformer 10. It will be evident that this second branch may also be regarded as part of a series-combination between the terminals 2 and 1, that is to say the series-connection 2, 3, 4, 13, 14, 15 (and through 8 and 9 to 11) 12, 1. A secondary winding of the transformer is indicated by 16. The described portion of the electrical arrangement constitutes the main circuit of the converter.

This converter co-acts with a load which is connected to the secondary winding 16 of transformer 10. The converter also includes two auxiliary devices, that is to say a start device (cf. the rectangle I shown in dashed lines) and a generator device (cf. the rectangle II shown in dashed lines). The said auxiliary devices serve to obtain the correct pulses on the control electrodes 17 and 18 of the thyristors 5 and 13, respectively. The devices I and II do not serve to extinguish the thyristors since the converter is damped undercritically and a particular extinguishing device is therefore unnecessary.

The illustrated converter is intended to be connected to a DC source of 80 volts. The operating frequency of the converter is approximately 6600 c./s. The output voltage of the converter (voltage across the secondary winding 16) at no load is approximately 190 volts.

The substitution diagram of the circuit between the taps 7 and 11 may consist of the parallel combination of a capacitor and an inductor. In the case under consideration the said inductor has a value of 160 $\mu$h. and the coil 6 has an inductance of 20 $\mu$h. The ratio between the inductance of the substitution diagram of the circuit between the points 7 and 11 (which circuit forms part of the series-combination which includes the thyristor 5 and the coil 6 and which is intended to be connected to a supply source via the terminals 1 and 2) and the inductance of coil 6 is therefore 160:20=8.

Since coil 14 is identical with coil 6 and point 11 represents a centre tap on winding 9, the ratio between the inductance of the substitution diagram of the circuit between the points 15 and 11 and the inductance of coil 14 is naturally also 160:20=8.

The load shown comprises two stabilized low-pressure mercury-vapour discharge lamps 19 and 20, which are intended to ignite on cold electrodes. Lamp 19 is connected in series with a capacitor 21 and a switch 22 and lamp 20 is connected in series with a capacitor 23 and a switch 24. The series-combination 19, 21 and 22 and the series-combination 20, 23 and 24 constitute two partial loads which are connected in parallel with one another to output terminals 25 and 26 of the secondary winding 16 of the transformer.

The apparent power of the capacitor 21 (and also of capacitor 23) at the operating frequency of 6600 c./s. of the converter is approximately 38 va. The power of lamp 19 (and also of lamp 20) is 27 watts. The ratio between the apparent power of the capacitor and the power of the lamp is therefore 38:27=approximately 1.4. Even if further partial loads (such as the branches 19, 21, 22 and 20, 23, 24), for example, 12 partial loads, were switched into the circuit, the voltage 25–26 remained within 3% deviation from the no-load value of 190 volts.

If the ratio between the apparent power of the capacitor and the power of the lamp were increased above 1.7, or decreased below 1.1, the output voltage of the converter between no load and full load (12 partial loads) would vary by more than 20 volts and this is generally undesirable. For possible compensation of this large variation in voltage the operating frequency of the converter would have to vary by at least 400 c./s. However, this visibly influences the luminance of lamps already ignited.

Now, a short explanation of the design and operation of the auxiliary devices shows in dashed boxes I and II will be given, reference being also made to the operation of the main circuit of the converter.

To switch on the converter a starting pulse is required which renders one thyristor conducting. This is effected by means of the device I which is connected to point 4, the cathode side 27 of thyristor 13, and the control electrode 18. As soon as the converter is switched-on full supply voltage is set up between the points 4 and 27. Thus a capacitor 28 is charged through resistors 29 and 30 and a voltage divider 31, 32.

The emitter of a transistor 33 thus becomes more and more positive. The base of this transistor has a low positive voltage due to the presence of resistors 34 and 35. As soon as the emitter voltage exceeds the base voltage, the transistor becomes conducting and the capacitor 28 discharges through transistor 33 and resistors 36 and 37. The voltage across resistor 37 is applied to the control electrode 18 of thyristor 13. The pulse on the control electrode 18 has to be sufficiently long to make thyristor 13 conductive. To realize this the start circuit I comprises a transformer 38. The primary winding of transformer 38 shunts the current carrying resistor 36. As a result a current also will flow in the following circuit: the secondary winding of transformer 38, capacitor 39, capacitor 28, emitter of transistor 33 and base of transistor 33. This current keeps the base of transistor 33 negative relative to the emitter and thereby keeps the transistor conductive. The last mentioned current also charges the capacitor 39. Transistor 33 remains conductive until the base current, which is determined among others by capacitor 39, becomes so small that the collector current is interrupted.

By making thyristor 13 conductive the capacitor 8 of the converter is charged and hence the generator circuit II switched on.

The start circuit is then switched off automatically. This happens as follows. If thyristor 13 is conductive, then the points 4 and 27 are at the same voltage. Then capacitor 28 discharges across resistor 30 and diode 40. If the thyristor 13 now becomes non-conducting and point 27 becomes positive to point 4 diode 41 prevents the accumulation of a charge on capacitor 28.

The generator device II comprises an oscillatory circuit having a capacitor 42 and an inductor 43. The oscillatory circuit also includes a pulse transformer 44, and is coupled to the oscillatory circuit of the converter through an inductor 45. When, after a starting pulse, the main capacitor 8 is charged, a voltage is set up between the points 15 and 12 to which the generator circuit is connected. Consequently the circuit 42, 43 is excited. The current in this circuit flows through the pulse transformer 44 having a ferrite core with a rectangular hysteresis loop. Each zero passage of the said current causes a change-over of the magnetic state of the core to the opposite value so that a voltage pulse of short duration is produced. This voltage is applied through a diode 46 and a resistor 47 and a connecting point 48 to the control electrode of thyristor 5. A connecting point 49 is connected to the cathode side of thyristor 5. A resistor 50 constitutes a safety resistor. The first voltage pulse to be produced is led to thyristor 5 so that this thyristor becomes conducting and the circuit 42, 43 is against excited. The thyristor 5 extinguishes again due to the load current becoming zero. Through a similar circuit, the thyristor 13 now receives a pulse, etc. The latter circuit includes a diode 51, a resistor 52 and two connecting points 53 and 54. A resistor 55 is a safety resistor.

Due to the thyristors 5 and 13 alternately becoming conducting, an alternating current is produced in the primary winding of transformer 10. These changes are transferred to the secondary winding 16 of said transformer.

The arrangement described may naturally be refined further. Thus, for example, part of the coil 6 and part of the coil 14 may be replaced by a coil inserted between the points 1 and 12. Also, instead of using a fuse only, the safeguarding of the converter may be extended further.

What is claimed is:

1. An electrical arrangement comprising a direct current-alternating current converter and a load, said converter comprising the series-combination of a semiconductor controlled rectifier, an inductance and a circuit, the substitution diagram of said circuit consisting of the parallel combination of a capacitance and a second inductance, and wherein the said series-combination is connected to a supply source and the said circuit is coupled to the load, which comprises two or more gas- and/or vapour-discharge lamps and constitutes, together with the series-combination of the converter, an oscillatory circuit which is damped undercritically, characterized in that the ratio between the second inductance and the first-mentioned inductance is smaller than 15 and preferably smaller than 10, and that parts of the load, each of which comprises at least one discharge lamp and which have a capacitive character at the operating frequency of the converter, can be switched off individually.

2. An electrical arrangement as claimed in claim 1, characterized in that a partial load which may be switched off separately consists of the series-combination of a gas- and/or vapour-discharged lamp and a capacitor.

3. An electrical arrangement as claimed in claim 2, characterized in that in a partial load which may be switched off separately, the ratio between the apparent power of the capacitor and the power of the lamp is more than 1.1 and less than 1.7, and preferably more than 1.3 and less than 1.5, at the operating frequency of the converter.

4. An electric circuit arrangement comprising a DC-AC current converter and a load circuit including at least two electric discharge lamps each of which includes reactance means that exhibits a capacitive reactance at the operating frequency of the converter, said load circuit being arranged so that individual ones of said lamps and said reactance means can be selectively switched out of the circuit, said converter comprising the series combination of a semiconductor controlled rectifier, a first inductance and a circuit arrangement having an equivalent circuit comprising the parallel combination of a capacitor and a second inductance, means for connecting said series combination to a source of supply voltage, and means coupling said circuit arrangement to the load which constitutes, together with the series combination of the converter, a resonant circuit that is undercritically damped, the ratio of the second inductance to the first inductance being smaller than 15 to 1.

5. An electric circuit arrangement as claimed in claim 4 wherein the inductance ratio of said second inductance to said first inductance is less than 10 to 1, and wherein the part of the load circuit to be selectively switched comprises the series combination of an electric discharge lamp and a second capacitor.

6. An electric circuit arrangement as claimed in claim 5 wherein said lamp and second capacitor are chosen so that the ratio between the apparent power of said second capacitor to the power of the lamp lies in the range of 1.1 to 1.7, and preferably in the range of 1.3 to 1.5, at the operating frequency of the converter.

References Cited

UNITED STATES PATENTS 3,155,875  11/1964  Wenrich et al. _____ 315—279

JOHN W. HUCKERT, *Primary Examiner.*

J. D. CRAIG, *Assistant Examiner.*